United States Patent

Mortimer et al.

[15] 3,700,075
[45] Oct. 24, 1972

[54] BRAKING SYSTEMS

[72] Inventors: Frank R. Mortimer; Alan R. Brewster, both of Coventry; Michael J. Bartram, Nuneaton, all of England

[73] Assignee: The Dunlop Company Limited, Birmingham, England

[22] Filed: Sept. 25, 1970

[21] Appl. No.: 75,547

[30] Foreign Application Priority Data

Sept. 27, 1969 Great Britain..........47,630/69

[52] U.S. Cl. ................................................188/346
[51] Int. Cl. .............................................B60t 13/10
[58] Field of Search................188/345, 349; 303/6 C

[56] References Cited

UNITED STATES PATENTS

| | | |
|---|---|---|
| 3,348,637 | 10/1967 | Perez........................188/346 |
| 3,173,517 | 3/1965 | Powlas......................188/346 |
| 3,261,432 | 7/1966 | Tournier................188/346 X |
| 3,459,281 | 8/1969 | Lepelletier.............188/346 X |

*Primary Examiner*—George E. A. Halvosa
*Attorney*—John A. Young

[57] ABSTRACT

A self-servo device for a fluid pressure operated braking system and utilizing torque reaction developed by the brake and transmitted as fluid pressure by a torque sensing unit sensitive to the braking torque reaction to amplify the fluid pressure supplied from the device to the brake, the device preventing an unlimited rise in the fluid pressure supplied to the brake so as to maintain a substantially constant torque reaction, a fluid flow damping unit being fitted to a movable member of the self-servo device.

17 Claims, 1 Drawing Figure

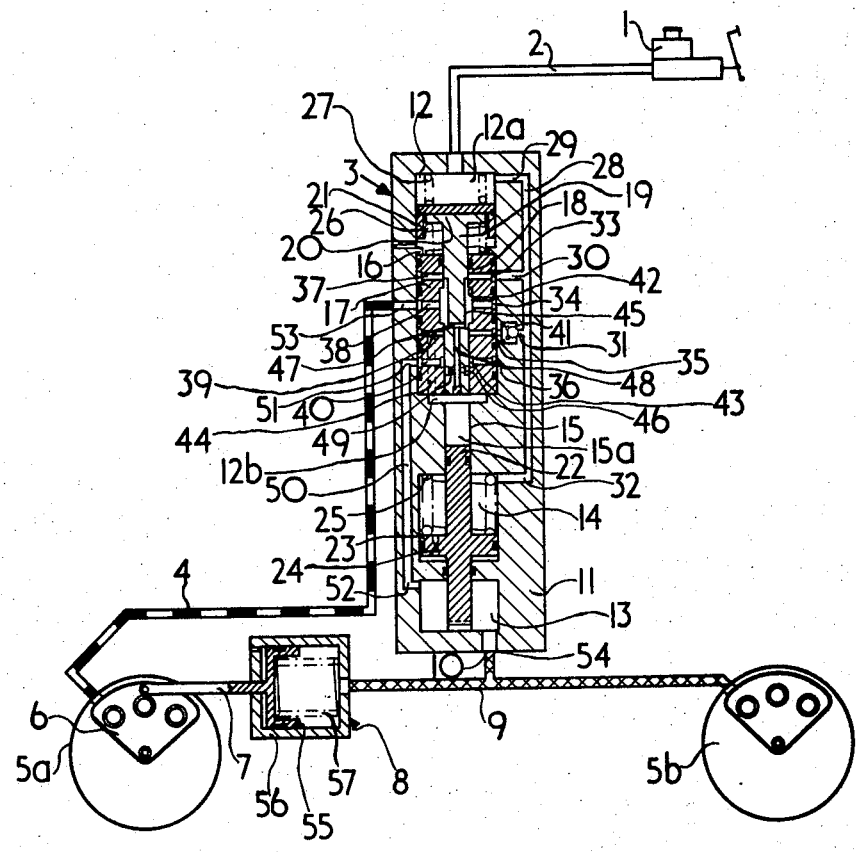

BRAKING SYSTEMS

This invention relates to braking systems and to self-servo devices for incorporation in fluid pressure operated braking systems, and is an improvement in or modification of the invention described and claimed in the complete specification filed in respect of our U.K. Pat. Application Ser. No. 9,048/68.

In the complete specification of our U.K. Pat. Ser. No. 1,251,335 we have claimed a self-servo device for a fluid pressure operated braking system comprising a housing, an input chamber formed in the housing and arranged for connection to a source of input fluid pressure, a thrust member located in the housing and movable within a pressure chamber arranged for connection to a fluid pressure operated brake-actuating mechanism of a brake, the housing and the thrust member being respectively arranged to be mounted so that at least part of the torque reaction thrust arising from application of the brake is transmitted through the thrust member, through fluid contained in the pressure chamber and the input chamber and through the housing, the device further comprising a balance member and a valve associated therewith, the balance member being arranged to be urged in opposite directions by forces exerted thereon and generated at least in part by the fluid pressures in the input chamber and the pressure chamber respectively, and being arranged to cause the valve to release fluid from the brake when said forces are out of balance.

In this specification a self-servo device as defined in he last preceding paragraph will be referred to as "a self-servo device as set forth."

An object of the present invention is to provide a braking system incorporating a self-servo device as set forth having improved operating characteristics.

According to the invention a braking system comprises a self-servo device as set forth, a torque-sensing unit for connection to the brake and arranged so that fluid pressure is generated in the torque-sensing unit by the torque reaction produced by the brake, the thrust member of the servo device being arranged to be actuated by the said fluid pressure.

According to a further aspect of the invention a self-servo device as set forth comprises a fluid flow damping unit connected to the thrust member and arranged so that movement of the thrust member causes a flow of fluid through a restrictor.

The embodiment of the invention will now be described by way of example with reference to the accompanying drawing which shows diagrammatically a braking system according to the invention, the torque-sensing unit and the self-servo device being shown sectioned and in the unenergized, brake released, condition.

A vehicle braking system comprises a source of fluid pressure in the form of a foot-operated master cylinder 1 connected by a fluid supply line 2 to a self-servo device 3 to be described. The fluid output of the servo device is supplied through a further fluid supply line 4 to a first fluid pressure operated disc brake 5 associated with a wheel of the vehicle.

A portion 6 of the disc brake 5 which resists circumferential movement of the brake friction pads is mounted so as to be angularly movable under the influence of the torque reaction generated when the brake is applied, and is mechanically connected by a link 7 to a torque-sensing unit 8 arranged to generate fluid pressure when the brake is applied. The torque-sensing unit is connected by fluid pressure supply lines 9,10 both to the self-servo device 3 and to a second brake 5b similar to the first brake.

The detailed construction of the self-servo device 3 is as follows. An elongated housing 11 has formed therein three cylindrical chambers 12,13,14 at spaced positions along the length thereof and interconnected by a central axially-extending bore 15a of considerably smaller diameter than the cylindrical chambers. The chambers will be respectively referred to as a first chamber 12, a thrust chamber 13 and a damping chamber 14, the damping chamber being formed between the first chamber and the thrust chamber.

An annular rib 16 is provided on the cylindrical wall of the first chamber 12 between the ends thereof and locates a sleeve 17 in engagement with the axially innermost end of the first chamber. The internal bore 18 of the sleeve 17 is aligned with and provides a continuation into the first chamber of the central bore 15a formed in the housing 11, nd has the same diameter as the said central bore.

A rod-like balance member 19 is slidably located in the internal bore of the sleeve and has an enlarged head portion 20 located in the portion of the first chamber which lies axially outwardly of the annular rib provided therein. The said portion of the first chamber 12 constitutes an input chamber 12a and a piston 21 slidably located therein is engageable with the head portion 20 of the balance member.

A rod-like thrust member 22 is slidably located in the central bore 15a formed in the housing, the thrust member extending from between the first chamber 12 and the damping chamber 14, through the damping chamber and into the thrust chamber 13. A damping piston 23, slidably located in the damping chamber and secured to the thrust member has an axially extending restricted bore 24 formed therethrough to permit a restricted flow of fluid from one side of the piston to the other. A coiled compression spring 25 located in the thrust chamber and acting on the damping piston, urges the thrust member 22 towards the thrust chamber.

Coiled high rate compression springs 26,27 are located in the input chamber and act in opposition, one 26 on the enlarged head portion 20 of the balance member, and the other 27 on the associated piston 21.

The fluid connections within the servo device are as follows.

Fluid can enter the input chamber 12a from the fluid line 2 from the master cylinder through a fluid inlet connection.

A first axial drilling 28 formed in a radially outer portion of the housing 11 together with first, second, third and fourth drillings 29,30,31,32 extending radially inwardly through the housing therefrom allow communication of fluid between he first chamber 12 and the damping chamber 14.

First, second, third and fourth annular grooves 33, 34,35,36 are formed at equally axially spaced positions in the external surface of the sleeve 17 in the first chamber. First, second, third and fourth radial drillings 37,38,39,40 formed in the sleeve provide communication between the first, second, third and fourth annular grooves 33,34,35,36 respectively and the internal bore 18 of the sleeve.

The first, second, third and fourth radial drillings 29,30,31,32 formed in the housing and extending radially inwardly from the first axial drilling 28 communicate respectively with the input chamber 12a, the first annular groove 33 formed in the sleeve 17, through a non-return ball valve 41 with the third annular groove 35 formed in the sleeve and with the damping chamber 14.

The second and fourth radial drillings 38,40 formed in the sleeve terminate respectively in first and second annular channels 42,43 formed in the internal bore 18 of the sleeve 17.

An axial drilling 44 formed in the sleeve provides for fluid communication between the third radial drilling 39 formed in sleeve and a reduced diameter and portion 12b of the first chamber 14 of the housing and hence with the central bore 15a formed in the housing.

First and second annular channels, 45,46 are formed in the external surface of the rod-like balance member 19, and radial and axial drillings 47,48,49 are formed in the balance member interconnecting these channels.

A second axial drilling 50 in the housing together with fifth and sixth radial drillings 51,52 extending radially inwardly through the housing allow communication of fluid between the fourth annular groove 36, formed in the external surface of the sleeve 17, and the thrust chamber 13.

A fluid outlet drilling 53 extends radially outwardly from the second annular groove 38 formed in the sleeve 17 through the housing to a fluid outlet connection and the fluid supply line 4 to the first disc brake 5a. A fluid inlet connection 54 connected to the fluid supply lines 9,10 from the torque-sensing unit 8 allows fluid to enter the thrust chamber 13 therefrom.

The torque-sensing unit 8 comprises a piston and cylinder assembly. The piston 55 is mechanically linked to the angularly movable portion 6 of the first disc brake 5a and a compression spring 57 located in the cylinder 56 opposes movement of the piston caused by the brake's torque reaction.

The mode of operation of the braking system is as follows.

Before the system is brought into operation the thrust member 22 is held by the compression spring 25 in the damping chamber 13 at the limit of its travel in the direction away from the first chamber 12. The balance member 19 is held by the two opposed compression springs 26,27 in the input chamber so that the first and second annular channels 45,46 formed therein communicate respectively with the first and second annular channels 42,43 formed in the internal bore 18 of the sleeve 17. The first annular channel 45 formed in the balance member is so positioned as to communicate in this unenergized condition of the system with the radially inner end of the first radial drilling 37 formed in the sleeve. The balance member is positioned so that a short movement of the balance member towards the thrust member 22 would disconnect the first annular channel 45 formed in the balance member from the first radial drilling 37 formed in the sleeve. The axial length of the first annular channel formed in the balance member is such that any further movement of the balance member towards the thrust member would bring the channel into communication with the third radial drilling 39 formed in the sleeve.

Fluid pressure generated by the driver's master cylinder 1 is communicated to the input chamber 12a of the servo device 3, and acting on the piston 26 therein moves the balance member 19 towards the damping chamber 13. This movement brings the first annular channel 45 formed in the balance member into communication with the third radial drilling formed 39 in the sleeve, and at the same time disconnects the second annular channel 46 formed in the balance member from the second annular channel 43 formed in the internal bore of the sleeve.

The fluid pressure in the input chamber 12a is communicated through the first radial, the first axial and the third radial drillings 29,28,31 formed in the housing to the third annular groove 35 formed in the external surface of the sleeve 17 and from thence via the third radial drillings 39 in the sleeve the first annular channel 45 in the balance member 19 to the first annular channel 42 in the internal bore of the sleeve and so to the fluid outlet drilling 53 and the first disc brake 5a.

The brake is thus applied, and the brake's torque reaction exerts a thrust on the piston 55 of the torque-sensing unit 8. This generates fluid pressure in the torque-sensing unit and the fluid pressure is communicated to the thrust chamber 13 of the servo device and to the second disc brake 5b which is thereby also applied.

The fluid pressure generated by the torque-sensing unit 8 and communicated to the thrust chamber 13 moves the thrust member 22 axially inwardly towards the balance member 19. The pressure of the fluid located in the portion of the central bore 15a, formed in the housing between the confronting ends of the thrust member 22 and the balance member 19, and constituting a pressure chamber 15, is thereby raised and communicated via the reduced diameter end portion 12b of the first chamber and the axial drilling 44 in the sleeve to the third radial drillings 39 in the sleeve and thence to the first disc brake 5a.

It will be seen that a positive feedback loop has been established. Torque reaction generated by the first brake produces fluid pressure in the torque-sensing unit which is communicated to the thrust chamber of the servo device. The thrust member is thereby caused to generate pressure in the pressure chamber which is fed back to the first brake, and so on.

The pressure in the pressure chamber 15 rises smoothly to a level well above that in the input chamber 12a. The non-return valve 41 in the third radial drilling in the housing prevents the escape of this high pressure fluid to the input chamber.

The establishment of the positive feedback loop causes the system to multiply the fluid pressure within the fluid system which forms part of the loop so that once the loop is established the fluid pressure applied to the brakes steadily rises. Pressure control means is provided however to control the fluid pressure generated by the system.

The pressure control means operates as follows.

The rise in fluid pressure in the pressure chamber 15 caused in the manner described above exerts a force on the balance member 19 in opposition to the force exerted thereon by the fluid pressure in the input chamber acting on the piston 26 therein. When the fluid pressure in the pressure chamber has risen sufficiently, the force thereby exerted on the balance member exceeds the opposing force arising from the input chamber fluid pressure, and the balance member moves axially outwardly away from the thrust member 22. This movement brings the first annular channel 45 formed in the balance member into communication with the first radial drillings 37 in the sleeve and at the same time disconnects it from the third radial drillings 39 in the sleeve. The positive feedback loop is thus broken and fluid pressure in the first brake begins to exhaust into the input chamber via the first axial drilling 29 formed in the housing.

The reduction in fluid pressure in the first brake reduces the torque reaction it produces and in consequence the pressure supplied to the thrust chamber by the torque-sensing unit and generated in the pressure chamber by the thrust member decreases. The force exerted on the balance member 19 by the fluid pressure in the pressure chamber 15 decreases until it is slightly less than the opposing force generated in the input chamber 12a whereupon the balance member moves a short distance back towards the damping chamber 14, bringing the first annular channel 45 formed in the balance member out of communication with the first radial drillings 37 in the sleeve. This movement is sufficient to raise the pressure in the pressure chamber slightly and thereby balance the opposing forces acting on the balance member.

If the driver should wish to increase further the pressure supplied to the brakes he presses harder on his foot pedal causing an increased fluid pressure in the input chamber. This moves the balance member from its balanced position axially inwardly and re-establishes the positive feedback loop. The pressure supplied to the brake is steadily increased until the pressure in the pressure chamber has risen sufficiently for the forces acting on the balance member to be in balance again. The positive feedback loop is then broken again and the increased pressure maintained in the brake.

To release the brake, the driver releases his foot pedal and the consequent fall in pressure in the input chamber puts the forces acting on the balance member out of balance, and the balance member moves axially outwardly to bring the first annular channel 45 formed therein into communication with the first radial drillings 37 in the sleeve, and fluid pressure in the first brake 5a is exhausted into the input chamber. The torque reaction generated by the first brake falls and the fluid pressure generated by the torque-sensing unit and communicated to the second brake 5b also falls, releasing the second brake.

When the brakes are released, fluid pressure in the thrust chamber falls, and the thrust member is returned by the compression spring in the damping chamber to the limit of its travel away from the first chamber. As the thrust member retracts, fluid flows into the pressure chamber 15 from the input chamber via the non-return valve 41, the third radial drillings 39 in the sleeve, the axial drilling 44 in the sleeve and the reduced diameter end portion 12b of the first chamber. Fluid flows from the thrust chamber as the thrust member retracts, to the input chamber via the second axial drilling 50 in the housing, the fourth annular channel 43 formed in the internal bore of the sleeve and the drillings 47,48,49 formed in the balance member.

The damping piston 23 connected to the thrust member and slidably located in the damping chamber checks any tendency of the thrust member to "hunt" up and down in the central bore of the housing. This assists in ensuring stable operation of the system.

Likewise, the opposed coiled compression springs 26,27 located in the input chamber and acting on the balance member also promote stability in the system. By providing a strong centralizing force opposing movement of the balance member by out of balance forces arising from fluid pressure in the input and pressure chambers the compression springs check any tendency of the balance member to "hunt" up and down in the internal bore of the sleeve.

The non-return valve 41 located between the ends of the third radial drilling 31 in the housing functions as an inlet valve when the brakes are first applied, prevents escape of fluid from the pressure chamber once the brakes have been applied and when the brakes are being released permits rapid entry of fluid into the pressure chamber so as to allow recuperation of the thrust member.

The servo device operates to amplify the fluid pressure developed by the driver's master cylinder, as follows. The initial application of the brakes by direct action of fluid pressure from the driver's master cylinder 1 sets up the positive feedback loop described above whereby torque reaction generated by the brake is used to generate fluid pressure in the torque-sensing unit 8 and in the pressure chamber 15, and this pressure is fed back to the brake 5a. As is also described above, the balance member 19 operates to break the positive feedback loop when the forces acting on the balance member arising from the fluid pressures in the pressure chamber and in the input chamber 12a are in balance.

For the balance member to be balanced:

$$P_1 A_1 = P_2 A_2$$

$$A_1/A_2 = P_2/P_1$$

where
$P_1$ = fluid pressure in input chamber;
$P_2$ = fluid pressure in pressure chamber;
$A_1$ = cross-sectional area of piston in input chamber;
$A_2$ = cross-sectional area of rod-like portion of balance member.

Thus if the ratio of the areas $A_1/A_2$ is 6 to 1 the ratio of the fluid pressures developed in the system will be 1 to 6. The servo device can thus be employed to generate a fluid pressure which is any reasonable multiple of the pressure generated in the master cylinder, by choosing the relative areas $A_1$ and $A_2$ accordingly.

Further, if the brake fades during use, the decreased torque reaction generated thereby will produce a decreased fluid pressure output from the torque-sensing unit and the pressure in the pressure chamber will fall, allowing movement of the balance member from the balanced position axially inwardly and re-establishing the positive feedback loop. The pressure in the pressure chamber and consequently the brakes will then steadily rise until the balance member is again balanced. Thus, since the fluid pressure in the pressure chamber is generated by the torque reaction of the brake, the maintenance of a substantially constant fluid pressure in the pressure chamber corresponding to a substantially constant (but lower) pressure in the input chamber implies the maintenance of substantially constant torque reaction corresponding to the input pressure i.e. the system provides automatic compensation for brake fade.

Since the transverse cross-sectional area of the rod-like portion of the balance member is relatively small when compared, for example, with the corresponding area of the piston in the input chamber, the balance member can be economically produced to the exact size required to minimize leakage between the balance member and the internal bore of the sleeve at the high fluid pressures generated in use.

In the embodiment of the invention described above, the diameter of the piston of the torque-sensing unit is considerably larger than the diameter of the end of the rod-like thrust member over which the fluid pressure generated by the torque-sensing unit acts on the thrust member, so that the force acting on the thrust member in use is correspondingly smaller than the force acting on the piston of the torque-sensing unit. It has been found however that the torque reaction developed by an aircraft brake is still quite sufficient to generate any reasonable fluid pressure in the pressure chamber.

Furthermore, on account of the relatively large diameter of the piston of the torque-sensing unit in relation to the pistons of fluid pressure actuated brakes, the fluid pressure output of the torque-sensing unit from a small movement of its piston is sufficient to operate two or more brakes. This provides considerably improved flexibility in the system, allowing a single servo device to control several or all of the brakes of a light to medium weight aircraft. The fluid output of the driver or pilot's master cylinder may be insufficient to apply all the brakes itself, but in the system described above, the driver or pilot need apply only the brake which actuates the torque-sensing unit. The other brakes are applied by the fluid pressure generated by the torque-sensing unit.

A further advantage arising from the relatively large diameter of the piston of the torque-sensing unit is that it reduces the angular movement of the angularly movable portion of the first disc brake required to produce a sufficient volume of fluid to actuate the second and other brakes.

Different brakes produce different levels of maximum torque reaction in use. The braking system described above can be very easily adapted to the requirements of any given brake by providing a torque-sensing unit having an appropriately dimensioned piston (or diaphragm), the servo device itself requiring no modification.

The connections to the servo device itself in the embodiment described above, are all fluid pressure lines. Consequently the servo device can be located at any convenient position where the fluid lines can be connected to it. For example, the servo device may be mounted on the driver or pilot's master cylinder. Only the torque-sensing unit is preferably located in close proximity to the first brake, so as to minimize the length of the mechanical connection to the first brake.

Having now described our invention, what we claim is:

1. A self-servo device for a fluid pressure operated braking system comprising a torque-sensing unit, a source of operator-controlled input fluid pressure, a housing forming an input chamber operatively connected to the brake-actuating mechanism of the brake, a pressure chamber and a thrust chamber operatively connected to said torque-sensing unit which measures the output of the brake, a fluid pressure responsive means responsive to fluid pressure within said thrust chamber and said pressure chamber and displaceable to effect pressure build-up within said pressure chamber, which is communicated as servo-applying pressure from said pressure chamber to the brake, a balancing member adapted to override the application of servo-pressure and movable responsibly to the pressures in said input chamber and pressure chamber respectively which act upon said balancing member as opposed pressures, and hydraulic fluid connection means between said input chamber and brake actuating means which are opened responsively to movement of said balancing member in one direction to effect reduction of brake pressure to an equilibrium pressure whereby brake output which is derived from both operator effort and servo effort is at all times proportional to the pressure developed by the operator within said input chamber.

2. Apparatus in accordance with claim 1 including centralizing means yieldably opposing movement of said balancing member to suppress hunting of the balancing member as equilibrium pressures are effected between the input-effort-generated pressure in the input chamber and the pressures generated in the pressure chamber by the torque-sensing unit.

3. Apparatus in accordance with claim 2 whereby the torque-sensing unit pressure is substantially constantly proportional to input effort whereby brake output remains substantially constantly proportional to input effort exerted by the operator.

4. A braking system comprising a self-servo device comprising a housing, an input chamber formed in the housing and arranged for connection to a source of input fluid pressure, a thrust member located in the housing and slidable within a pressure chamber and having a connection to a fluid pressure operated brake-actuating mechanism of a brake, the pressure chamber and the thrust member being respectively arranged to receive at least part of the brake reaction thrust arising from application of the brake and to communicate such thrust through fluid contained in the pressure chamber to the input chamber, the device further comprising a balance member and a valve associated therewith, the balance member being arranged to be urged in opposite directions by forces exerted thereon and generated at least in part by the fluid pressures in the input chamber and the pressure chamber respectively, and arranged to cause the valve to release fluid from the brake actuating mechanism when said forces are out of balance, the braking system further comprising a torque-sensing unit for connection to the brake and arranged so that fluid pressure generated in the torque-sensing unit by a torque reaction produced by the brake is communicated to the thrust member.

5. A braking system according to claim 4 wherein the torque-sensing unit is formed as a unit separate from the self-servo device and includes a supply line connected thereto whereby fluid pressure generated by the torque-sensing unit actuates the thrust member of the self-servo device.

6. A braking system according to claim 4 wherein said torque sensing unit includes fluid connection to said thrust member and one or more brakes which are arranged to be actuated by the fluid pressure generated by the torque-sensing unit.

7. A braking system according to claim 4 wherein a one-way valve in the form of a ball valve controls the flow of fluid from the input chamber to the pressure chamber.

8. A braking system according to claim 4 wherein the torque-sensing unit is proportioned, in relation to the surface area over which the fluid pressure produced by the torque-sensing unit acts on the thrust member, so that the thrust exerted thereon is smaller than the thrust exerted on the torque-sensing unit by the torque reaction produced by the brake.

9. A braking system according to claim 4 including means acting on the balance member to resist movement of the balance member responsively to the fluid pressures in the input and pressure chambers.

10. A braking system according to claim 9 wherein said means acting on the balance member is constituted by a pair of springs acting on the balance member in opposing directions.

11. A braking system according to claim 4 wherein a fluid flow damping unit having a restrictor is connected to the thrust member and arranged so that movement of the thrust member causes a flow of fluid through said restrictor.

12. A braking system according to claim 11 wherein the fluid flow damping unit comprises a movable member mounted in said fluid pressure chamber and provided with a fluid flow line extending between two regions of the movable member, said movable member being arranged to tend to move in unison with the balance member and thereby cause fluid to flow along the fluid flow line.

13. A braking system according to claim 4 wherein the valve associated with the balance member is in the form of a slide valve having channels formed therein and a relatively stationary valve member having drillings alignable with said channels.

14. A braking system according to claim 13 wherein the disposition of the channels and drillings formed in the slide valve is such that in a balanced condition of the balance member a channel in the movable member is in communication with that drilling in the stationary member providing communication with the fluid brake-actuating mechanism, change of pressure in the input or pressure chambers effecting fluid communication of the brake-actuating mechanism through said channel in the movable member with either the input chamber or the pressure chamber.

15. A braking system according to claim 13 wherein said balance member is a movable member slidably located in the housing and having a greater cross-sectional area which is acted upon by fluid in the input chamber to exert a thrust on the balance member than the cross-sectional area over which fluid in the pressure chamber is arranged to exert a thrust on said member.

16. A braking system according to claim 15 wherein said slide valve is operable to release fluid from the brake-actuating mechanism by alignment of a channel in the movable member with a drilling in the relatively stationary member, fluid communication thereby being effected between the fluid pressure operated brake actuating mechanism and the input chamber.

17. A braking system according to claim 15 wherein the slide valve is operable to align a channel with a drilling in the stationary member and thereby permit the flow of fluid from the input chamber with the pressure chamber.

* * * * *